United States Patent
Jiang (10) Patent No.: US 11,582,793 B2
(45) Date of Patent: Feb. 14, 2023

(54) INFORMATION REPORTING METHOD AND APPARATUS, AND BANDWIDTH PART BASED OPERATING METHOD AND APPARATUS

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/980,911

(22) PCT Filed: Mar. 29, 2018

(86) PCT No.: PCT/CN2018/081088
§ 371 (c)(1),
(2) Date: Sep. 15, 2020

(87) PCT Pub. No.: WO2019/183881
PCT Pub. Date: Oct. 3, 2019

(65) Prior Publication Data
US 2021/0007132 A1    Jan. 7, 2021

(51) Int. Cl.
*H04W 72/04* (2009.01)
*H04W 74/00* (2009.01)
(Continued)

(52) U.S. Cl.
CPC ......... *H04W 74/008* (2013.01); *H04L 5/0092* (2013.01); *H04L 5/1469* (2013.01);
(Continued)

(58) Field of Classification Search
CPC ........... H04W 74/008; H04W 74/0833; H04W 76/19; H04W 76/27; H04W 76/18;
(Continued)

(56) References Cited

U.S. PATENT DOCUMENTS 11,368,996 B2 * 6/2022 Cirik .................... H04B 7/0695
2013/0188473 A1   7/2013 Dinan
(Continued)

FOREIGN PATENT DOCUMENTS

| CN | 101959230 A | 1/2011 |
|---|---|---|
| CN | 101998431 A | 3/2011 |

(Continued)

OTHER PUBLICATIONS

State Intellectual Property Office of the People's Republic of China, Office Action and Search Report Issued in Application No. 201880000624.X, dated Jan. 28, 2021, 18 pages, (Submitted with Machine Translation).

(Continued)

*Primary Examiner* — Mahbubul Bar Chowdhury
(74) *Attorney, Agent, or Firm* — Syncoda LLC; Feng Ma (57) ABSTRACT

An information reporting method includes: determining that a random access problem occurs; and reporting, to a base station, a bandwidth part (BWP) on which the random access problem occurs. By determining that the random access problem occurs and reporting the BWP on which the random access problem occurs to the base station, the base station may determine the BWP on which the random access problem occurs.

15 Claims, 7 Drawing Sheets

---

Receive a BWP on which a random access problem occurs from UE — S201

Reconfigure a random access parameter of the BWP on which the random access problem occurs for the UE, or report the random access problem to another data collection entity for determining a cause of the random access problem — S202

(51) Int. Cl.
*H04W 76/19* (2018.01)
*H04W 76/27* (2018.01)
*H04L 5/00* (2006.01)
*H04L 5/14* (2006.01)
*H04W 24/10* (2009.01)
*H04W 74/08* (2009.01)
*H04W 80/02* (2009.01)
*H04W 84/18* (2009.01)

(52) U.S. Cl.
CPC ....... *H04W 24/10* (2013.01); *H04W 74/0833* (2013.01); *H04W 76/19* (2018.02); *H04W 76/27* (2018.02); *H04W 80/02* (2013.01); *H04W 84/18* (2013.01)

(58) Field of Classification Search
CPC ..... H04W 24/10; H04W 24/04; H04W 80/02; H04W 84/18; H04L 5/0092; H04L 5/1469
See application file for complete search history.

(56) References Cited

U.S. PATENT DOCUMENTS

| | | | | |
|---|---|---|---|---|
| 2014/0023032 | A1* | 1/2014 | Kim | H04W 72/085 370/329 |
| 2016/0057800 | A1 | 2/2016 | Ingale et al. | |
| 2017/0117997 | A1 | 4/2017 | Park et al. | |
| 2017/0303148 | A1 | 10/2017 | Johansson et al. | |
| 2017/0353222 | A1 | 12/2017 | Wei et al. | |
| 2019/0200392 | A1* | 6/2019 | Agiwal | H04L 5/0089 |
| 2019/0246442 | A1* | 8/2019 | Park | H04W 72/0453 |
| 2019/0254074 | A1* | 8/2019 | Jeon | H04W 74/004 |
| 2019/0254114 | A1* | 8/2019 | Son | H04L 5/001 |
| 2019/0297514 | A1* | 9/2019 | Pao | H04W 36/0055 |
| 2019/0364602 | A1* | 11/2019 | Yi | H04W 72/1278 |
| 2020/0021420 | A1* | 1/2020 | Li | H04L 5/0007 |
| 2020/0045702 | A1* | 2/2020 | Chen | H04W 74/0833 |
| 2020/0119898 | A1* | 4/2020 | Orsino | H04L 5/0098 |
| 2020/0280894 | A1* | 9/2020 | Koskinen | H04W 72/048 |
| 2020/0288502 | A1* | 9/2020 | Lee | H04W 24/08 |
| 2020/0396044 | A1* | 12/2020 | Lee | H04L 47/74 |

FOREIGN PATENT DOCUMENTS

| | | |
|---|---|---|
| CN | 101998661 A | 3/2011 |
| CN | 102056297 A | 5/2011 |
| CN | 102143533 A | 8/2011 |
| CN | 102291731 A | 12/2011 |
| CN | 103999528 A | 8/2014 |
| CN | 110536436 A | 12/2019 |
| JP | 2011504048 A | 1/2011 |
| JP | 2021503754 A | 2/2021 |
| KR | 20120115953 A | 10/2012 |
| KR | 20160048177 A | 5/2016 |
| KR | 20160087801 A | 7/2016 |
| KR | 20170105518 A | 9/2017 |
| RU | 2602981 C2 | 11/2016 |
| WO | 2011018042 A1 | 2/2011 |
| WO | WO-2011017913 A1 * | 2/2011 ............. H04L 1/20 |
| WO | 2017031725 A1 | 3/2017 |
| WO | 2019097432 A1 | 5/2019 |

OTHER PUBLICATIONS

European Patent Office, Extended European Search Report Issued in Application No. 18912062.9, dated Mar. 10, 2021, Germany, 12 pages.
State Intellectual Property Office of the People's Republic of China, Office Action and Search Report Issued in Application No. 201880000624X, dated Sep. 3, 2020, 13 pages, (Submitted with Machine Translation).
ISA State Intellectual Property Office of the People's Republic of China, Written Opinion of the International Searching Authority Issued in Application No. PCT/CN2018/081088, dated Aug. 1, 2018, WIPO, 9 pages.
Ericsson,"Report of ASN.1 breakout session for Area 1",3GPP TSG-RAN WG2#101,Athens, Greece,Tdoc R2-1804021, Feb. 26-Mar. 2, 2018,12 pages.
ISA State Intellectual Property Office of the People's Republic of China, International Search Report Issued in Application No. PCT/CN2018/081088, dated Aug. 1, 2018, WIPO, 6 pages.
Intellectual property India, Office Action Issued in Application No. 202047044562, dated Dec. 2, 2021, 6 pages.
Japanese Patent Office Action, Office Action Issued in Application No. 2020-552304, dated Dec. 10, 2021, 8 pages. (Submitted with Machine Translation).
Xu Hang et al, "An implementation scheme for random access in TD-LTE systems",Information Technology, Mar. 3, 2016, 3 pages.
Ericsson, "BWP and RLM in NR", 3GPP TSG-RAN WG2 NR AH#3, R2-1800593, Vancouver, Canada, Jan. 22-26, 2018, 4 pages.
Korean Intellectual Property Office, Office Action Issued in Application No. 10-2020-7030905, dated Oct. 14, 2021, 14 pages.
Indonesian Patent Office, Office Action Issued in Application No. P00202007679, dated Sep. 8, 2021, 5 pages.
ZTE Corporation, Sane Chips, "Initial discussion on the impacts of BWP on RAN2", 3GPP TSG-RAN WG2 Meeting #99bis Prague, Czech Republic, R2-1711640, Oct. 9-13, 2017, 5 pages.
Korean Intellectual Property Office, Office Action Issued in Application No. 10-2020-7030905, dated Aug. 2, 2022, 15 pages. (Submitted with Partial Machine Translation).

* cited by examiner

FIG. 14

INFORMATION REPORTING METHOD AND APPARATUS, AND BANDWIDTH PART BASED OPERATING METHOD AND APPARATUS

CROSS-REFERENCE TO RELATED APPLICATION

This application is a national stage of International Application No. PCT/CN2018/081088 filed on Mar. 29, 2018, the disclosure of which is hereby incorporated by reference in its entirety.

TECHNICAL FIELD

The present disclosure relates to the field of communication technology, and in particular, to an information reporting method and apparatus, a bandwidth part (BWP) based operating method and apparatus, user equipment, a base station, and a computer readable storage medium.

BACKGROUND

In New Radio (NR), when User Equipment (UE) initiates random access on a Primary Cell (PCell) while the random access fails, the UE determines that a Radio Link Failure (RLF) occurred in a Master Cell Group (MCG), that is, a MCG RLF has occurred. When the UE initiates random access on a Primary Secondary Cell (PSCell) while the random access fails, the UE determines that a Secondary Cell Group (SCG) RLF has occurred. When the UE initiates random access on a serving cell (e.g., SCell) other than a Special Cell (SpCell) while the random access fails, the UE determines that an RLF has occurred but does not report RLF information. In response to determining that the MCG RLF occurred, the UE records relevant failure information, initiates a connection reestablishment process, and then indicates to a network that there is newly occurred failure information, which may be acquired from the UE by the network if necessary. In response to determining that the SCG RLF occurred, the UE also records relevant failure information, and initiates, to the network, an SCG failure information reporting process.

According to the NR, UE in a connected state on a cell may be configured with a plurality of uplink bandwidth parts (BWPs) or downlink BWPs at the same time, but only one activated uplink BWP and one activated downlink BWP are allowed at the same time. The network may instruct the UE to switch to a different BWP via Physical Downlink Control Channel (PDCCH). Usually, the UE initiates random access on an activated BWP, but if there is no random access resource on the activated BWP, the UE will switch to an initial uplink and downlink BWP for random access. In this case, the network knows whether the UE initiates the random access on the activated BWP or on the initial BWP. For the UE currently performing random access, upon receiving an instruction to switch to another BWP via the PDCCH, the UE may determine whether to continue the random access on the current BWP or switch to a new BWP for a new random access according to implementation of the UE. In this case, when a random access problem occurs, the network could not know on which BWP the random access failure occurs.

SUMMARY

In view of this, the present application discloses an information reporting method and apparatus, a BWP based operating method and apparatus, user equipment, a base station and a computer readable storage medium, so as to report a BWP on which a random access problem occurs, thereby solving the problem that a network cannot determine the BWP on which the random access problem occurs.

According to a first aspect of examples of the present disclosure, there is provided an information reporting method. The method is applicable to UE, and includes:
determining that a random access problem occurs; and
reporting, to a base station, a bandwidth part (BWP) on which the random access problem occurs.

In an example, determining that the random access problem occurs includes:
in response to that random access is initiated on a primary cell (PCell) of a master cell group (MCG) and a number of random access preamble transmissions reaches a maximum number of transmissions, sending first indication information from an MCG media access control (MAC) layer to a radio resource control (RRC) layer, wherein the first indication information indicates that the random access problem occurs; and
reporting, to the base station, the BWP on which the random access problem occurs includes: receiving, by the RRC layer, the first indication information, and storing, by the RRC layer, MCG radio link failure (RLF) related information according to the first indication information, wherein the MCG RLF related information comprises the BWP on which the random access problem occurs.

In an example, reporting, to the base station, the BWP on which the random access problem occurs further includes:
upon a next connection operation being to be initiated, sending second indication information to the base station, wherein the second indication information indicates that the UE stores the MCG RLF related information, and the next connection operation comprises connection establishment, connection restoration or connection reestablishment;
receiving, from the base station, a request for acquiring the MCG RLF related information; and
reporting, in response to the request, the MCG RLF related information to the base station.

In an example, determining that the random access problem occurs includes:
in response to that random access is initiated on a primary secondary cell (PSCell) of a secondary cell group (SCG) and a number of random access preamble transmissions reaches a maximum number of transmissions, sending third indication information from an SCG MAC layer to an RRC layer, wherein the third indication information indicates that the random access problem occurs; and
reporting, to the base station, the BWP on which the random access problem occurs includes:
receiving, by the RRC layer. the third indication information; and reporting, by the RRC layer, SCG failure information according to the third indication information, wherein the SCG failure information comprises fourth indication information, and the fourth indication information indicates the BWP on which the random access problem occurs.

In an example, reporting, to the base station, the BWP on which the random access problem occurs includes:
in response to that there is a random access resource on a currently activated BWP and the BWP on which the random access problem occurs is not the currently activated BWP, reporting, to the base station, the BWP on which the random access problem occurs; or
in response to that there is no random access resource on the currently activated BWP and the BWP on which the random access problem occurs is not an initial BWP, reporting, to the base station, the BWP on which the random access problem occurs.

In an example, the BWP on which the random access problem occurs includes at least one of an uplink BWP on which the random access problem occurs; or a downlink BWP on which the random access problem occurs.

In an example, in response to that the UE is in a time division duplex (TDD) mode, the BWP on which the random access problem occurs comprises the uplink or downlink BWP on which the random access problem occurs; and in response to that the UE is in a frequency division duplex (FDD) mode, the BWP on which the random access problem occurs comprises the uplink or downlink BWP on which the random access problem occurs.

According to a second aspect of the examples of the present disclosure, there is provided a BWP based operating method. The method is applicable to a base station, and includes:

receiving, from UE, a BWP on which a random access problem occurs; and reconfiguring, for the UE, a random access parameter of the BWP on which the random access problem occurs, or reporting the random access problem to another data collection entity for determining a cause of the random access problem.

In an example, receiving, from the UE, the BWP on which the random access problem occurs includes:

receiving, from the UE, second indication information which indicates that the UE stores MCG RLF related information, wherein the MCG RLF related information comprises the BWP on which the random access problem occurs;

sending a request for acquiring the MCG RLF related information to the UE; and receiving the MCG RLF related information reported by the UE in response to the request.

In an example, receiving, from the UE, the BWP on which the random access problem occurs includes:

receiving, from the UE, SCG failure information which comprises fourth indication information, wherein the fourth indication information indicates the BWP on which the random access problem occurs.

In an example, the method further includes:

in response to that no report concerning the BWP on which the random access problem occurs is received from the UE and there is a random access resource on a currently activated BWP, determining that the currently activated BWP is the BWP on which the random access problem occurs; or in response to that no report concerning the BWP on which the random access problem occurs is received from the UE and there is no random access resource on the currently activated BWP, determining that an initial BWP is the BWP on which the random access problem occurs.

According to a third aspect of the examples of the present disclosure, there is provided an information reporting apparatus. The apparatus is applicable to UE, and includes:

a determining module configured to determine that a random access problem occurs; and a reporting module configured to report, to a base station, a BWP on which the random access problem determined by the determining module occurs.

In an example, the determining module includes:

a first determining submodule configured to, in response to that random access is initiated on a PCell of an MCG and a number of random access preamble transmissions reaches a maximum number of transmissions, send first indication information to an RRC layer, wherein the first indication information indicates that the random access problem occurs; and the reporting module includes:

a receiving and storing submodule configured to receive the first indication information and store MCG RLF related information according to the first indication information, wherein the MCG RLF related information comprises the BWP on which the random access problem occurs.

In an example, the reporting module further includes:

a first sending submodule configured to, upon a next connection operation being to be initiated, send second indication information to the base station, wherein the second indication information indicates that the UE stores the MCG RLF related information, and the next connection operation comprises connection establishment, connection restoration or connection reestablishment;

a first receiving submodule configured to receive, from the base station, a request for acquiring the MCG RLF related information; and a first reporting submodule configured to report, in response to the request received by the first receiving submodule, the MCG RLF related information to the base station.

In an example, the determining module includes:

a second determining submodule configured to, in response to that random access is initiated on a PSCell of an SCG and a number of random access preamble transmissions reaches a maximum number of transmissions, send third indication information to an RRC layer, wherein the third indication information indicates that the random access problem occurs; and the reporting module includes:

a second reporting submodule configured to receive the third indication information and report SCG failure information according to the third indication information, wherein the SCG failure information comprises fourth indication information, and the fourth indication information indicates the BWP on which the random access problem occurs.

In an example, the reporting module includes:

a third reporting submodule configured to, in response to that there is a random access resource on a currently activated BWP and the BWP on which the random access problem occurs is not the currently activated BWP, report, to the base station, the BWP on which the random access problem occurs; or a fourth reporting submodule configured to, in response to that there is no random access resource on the currently activated BWP and the BWP on which the random access problem occurs is not an initial BWP, report, to the base station, the BWP on which the random access problem occurs.

In an example, the BWP on which the random access problem occurs includes at least one of an uplink BWP on which the random access problem occurs; or a downlink BWP on which the random access problem occurs.

In an example, in response to that the UE is in a TDD mode, the BWP on which the random access problem occurs comprises the uplink or downlink BWP on which the random access problem occurs; and in response to that the UE is in an FDD mode, the BWP on which the random access problem occurs comprises the uplink or downlink BWP on which the random access problem occurs.

According to a fourth aspect of the examples of the present disclosure, there is provided a BWP based operating apparatus. The apparatus is applicable to a base station, and includes:

a receiving module configured to receive, from UE, a BWP on which a random access problem occurs; and an operating module configured to reconfigure, for the UE, a random access parameter of the BWP on which the random access problem occurs received by the receiving module, or report, to another data collection entity, the random access problem corresponding to the BWP received by the receiving module for determining a cause of the random access problem.

In an example, the receiving module includes:

a first receiving submodule configured to receive, from the UE, second indication information which indicates that the UE stores MCG RLF related information, wherein the MCG RLF related information comprises the BWP on which the random access problem occurs;

a first sending submodule configured to send a request for acquiring the MCG RLF related information to the UE; and a second receiving submodule configured to receive the MCG RLF related information which is reported by the UE in response to the request sent by the first sending submodule.

In an example, the receiving module includes:

a third receiving submodule configured to receive, from the UE, SCG failure information which comprises fourth indication information, wherein the fourth indication information indicates the BWP on which the random access problem occurs.

In an example, the apparatus further includes:

a first determining module configured to, in response to that no report concerning the BWP on which the random access problem occurs is received from the UE and there is a random access resource on a currently activated BWP, determine that the currently activated BWP is the BWP on which the random access problem occurs, wherein the operation module is further configured to reconfigure, for the UE, the random access parameter of the BWP on which the random access problem occurs determined by the first determining module, or report, to the another data collection entity, the random access problem corresponding to the BWP determined by the first determining module for determining the cause of the random access problem; or the apparatus further includes:

a second determining module configured to, in response to that no report concerning the BWP on which the random access problem occurs is received from the UE and there is no random access resource on the currently activated BWP, determine that an initial BWP is the BWP on which the random access problem occurs, wherein the operation module is further configured to reconfigure, for the UE, the random access parameter of the BWP on which the random access problem occurs determined by the second determining module, or report, to the another data collection entity, the random access problem corresponding to the BWP determined by the second determining module for determining the cause of the random access problem.

According to a fifth aspect of the examples of the present disclosure, there is provided user equipment, including:

a processor; and a memory for storing instructions executable by the processor, wherein the processor is configured to:

determine that a random access problem occurs; and report, to a base station, a BWP on which the random access problem occurs.

According to a sixth aspect of the examples of the present disclosure, there is provided a base station, including:

a processor; and a memory for storing instructions executable by the processor, wherein the processor is configured to:

receive, from UE, a BWP on which a random access problem occurs; and reconfigure, for the UE, a random access parameter of the BWP on which the random access problem occurs, or report the random access problem to another data collection entity for determining a cause of the random access problem.

According to a seventh aspect of the examples of the present disclosure, there is provided a computer readable storage medium storing computer instructions, wherein the instructions are executed by a processor to perform the information reporting method as described above.

According to an eighth aspect of the examples of the present disclosure, there is provided a computer readable storage medium storing computer instructions, wherein the instructions are executed by a processor to perform the BWP based operating method as described above.

The technical solutions provided by the examples of the present disclosure may include the following beneficial effects.

By determining that the random access problem occurs, and reporting the BWP on which the random access problem occurs to the base station, the base station may determine the BWP on which the random access problem occurs.

By receiving, from the UE, the BWP on which the random access problem occurs, and reconfiguring, for the UE, the random access parameter of the BWP on which the random access problem occurs, or reporting the random access problem to the another data collection entity for determining the cause of the random access problem, the base station may determine the BWP on which the random access problem occurs, and based on this, perform corresponding operations.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Figure 1:
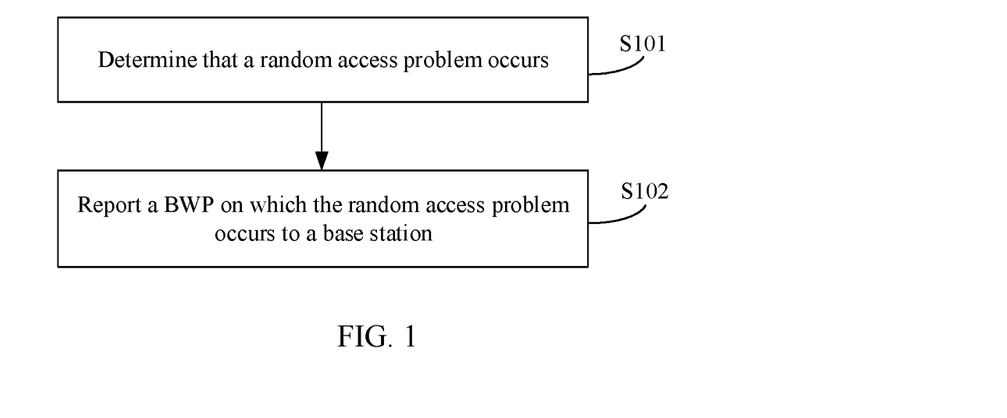
FIG. 1 is a flowchart illustrating an information reporting method according to an example of the present disclosure.

FIG. 1 is a flowchart illustrating an information reporting method according to an example of the present disclosure. This example is described from a UE side. As shown in FIG. 1, the information reporting method includes the following steps.

At step S101, it is determined that a random access problem occurs.

For different scenarios, UE in a connected state may determine that the random access problem occurs in many ways. For example, the UE determines that the random access problem occurs in the following approaches.

Approach 11: if random access is initiated on a PCell of an MCG and a number of random access preamble transmissions reaches a maximum number of transmissions, first indication information is sent to a radio resource control (RRC) layer from an MCG Media Access Control (MAC) layer, where the first indication information indicates that the random access problem occurs.

Approach 12: if random access is initiated on a PSCell of an SCG and a number of random access preamble transmissions reaches a maximum number of transmissions, third indication information is sent to the RRC layer from an SCG MAC layer, where the third indication information indicates that the random access problem occurs.

At step S102, a BWP on which the random access problem occurs is reported to a base station.

After the BWP on which the random access problem occurs is determined, the BWP on which the random access problem occurs may be reported to the base station.

In the example, upon determining that the random access problem occurs through the approach 11, the BWP on which the random access problem occurs may be reported to the base station in a following manner: the RRC layer receives the first indication information and stores MCG RLF related information according to the first indication information, where the MCG RLF related information includes the BWP on which the random access problem occurs. Upon storing the MCG RLF related information, the UE may report, to the base station, the BWP on which the random access problem occurs. For example, second indication information may be sent to the base station when a next connection operation is to be initiated, where the second indication information indicates that the UE has stored the MCG RLF related information. The UE receives a request for acquiring the MCG RLF related information from the base station, and reports the MCG RLF related information to the base station in response to the request.

The next connection operation may include connection establishment, connection restoration, connection reestablishment, or the like. The MCG RLF related information may be stored in an RLF-Report.

In this example, upon determining that the random access problem occurs through the approach 12, the BWP on which the random access problem occurs may be reported to the base station in a following manner: the RRC layer receives the third indication information and reports SCG failure information according to the third indication information, where the SCG failure information includes fourth indication information, and the fourth indication information indicates the BWP on which the random access problem occurs.

In addition, optionally, after the UE determines the BWP on which the random access problem occurs, in response to that there is a random access resource on a currently activated BWP and the BWP on which the random access problem occurs is not the currently activated BWP, the UE reports, to the base station, the BWP on which the random access problem occurs.

Further, optionally, after the UE determines the BWP on which the random access problem occurs, in response to that there is no random access resource on a currently activated BWP and the BWP on which the random access problem occurs is not an initial BWP, the UE reports, to the base station, the BWP on which the random access problem occurs.

The BWP on which the random access problem occurs may include at least one of an uplink (UL) BWP on which the random access problem occurs or a downlink (DL) BWP on which the random access problem occurs. If the UE is in a time division duplex (TDD) mode, the BWP on which the random access problem occurs includes the uplink BWP on which the random access problem occurs or the downlink BWP on which the random access problem occurs. If the UE is in a frequency division duplex (FDD) mode, the BWP on which the random access problem occurs includes the uplink BWP on which the random access problem occurs or the downlink BWP on which the random access problem occurs.

In this example, the BWP is identified by a UL BWP index or a DL BWP index. For the TDD mode, because the UL BWP is paired with the DL BWP, it is possible to indicate only the UL BWP index or the DL BWP index. For the FDD mode, although the UL BWP and the DL BWP are completely independent, the UL BWP and the DL BWP for random access have a mapping relationship. For example, a plurality of UL BWPs may be mapped to a single DL BWP, or single UL BWP may be mapped to a plurality of DL BWPs. Therefore, if the UL BWP may uniquely determine the DL BWP, only the UL BWP index may be indicated, or if the DL BWP may uniquely determine the UL BWP, only the DL BWP index may be indicated.

In the example, by determining that the random access problem occurs, and reporting, to the base station, the BWP on which the random access problem occurs, the base station may determine the BWP on which the random access problem occurs.

Figure 2:
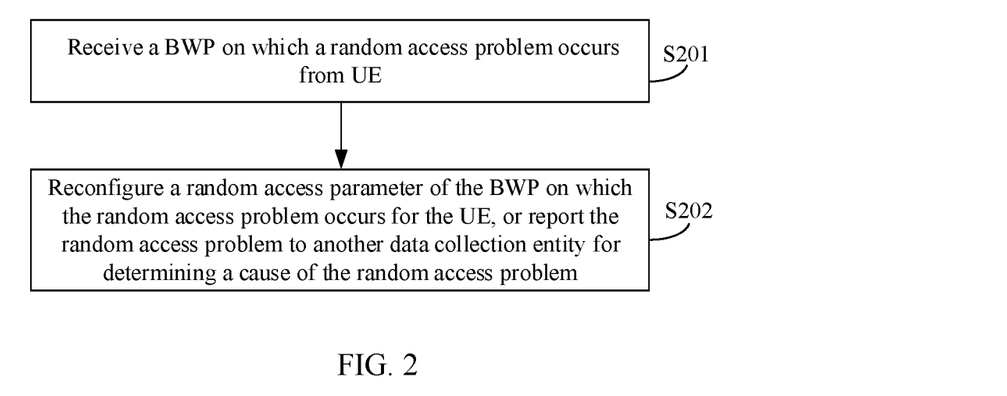
FIG. 2 is a flowchart illustrating a BWP based operating method according to an example of the present disclosure.

FIG. 2 is a flowchart illustrating a BWP based operating method according to an example of the present disclosure.

This example is described from a base station side. As shown in FIG. 2, the method includes the following steps.

At step S201, a BWP on which a random access problem occurs is received from UE.

For different scenarios, the base station may receive, from the UE, the BWP on which the random access problem occurs in different ways.

Approach 21: second indication information is received from the UE, where the second indication information indicates that the UE stores MCG RLF related information, and the MCG RLF related information includes the BWP on which the random access problem occurs; a request for acquiring the MCG RLF related information is sent to the UE; and the MCG RLF related information reported by the UE in response to the request is received.

Approach 22: SCG failure information is received from the UE, where the SCG failure information includes fourth indication information, and the fourth indication information indicates the BWP on which the random access problem occurs.

In addition, optionally, the method may further include: in response to that no report concerning the BWP on which the random access problem occurs is received from the UE and there is a random access resource on a currently activated BWP, determining that the currently activated BWP is the BWP on which the random access problem occurs.

Further, optionally, the method may further include: in response to that no report concerning the BWP on which the random access problem occurs is received from the UE and there is no random access resource on the currently activated BWP, determining that an initial BWP is the BWP on which the random access problem occurs.

At step S202, a random access parameter of the BWP on which the random access problem occurs is reconfigured for the UE, or the random access problem is reported to another data collection entity for determining a cause of the random access problem.

Upon receiving the BWP on which the random access problem occurs from the UE, the base station may reconfigure, for the UE, the random access parameter of the BWP on which the random access problem occurs, such that the UE may re-perform random access.

The another data collection entity may be a trace collection entity. After receiving the random access problem from the base station, the trace collection entity analyzes the problem to determine the cause of the problem.

In the above example, the BWP on which the random access problem occurs is received from the UE, and the random access parameter of the BWP on which the random access problem occurs is reconfigured for the UE, or the random access problem is reported to the another data collection entity for determining the cause of the random access problem. Thus, the base station may determine the BWP on which the random access problem occurs, and based on this, perform corresponding operations.

Figure 3:
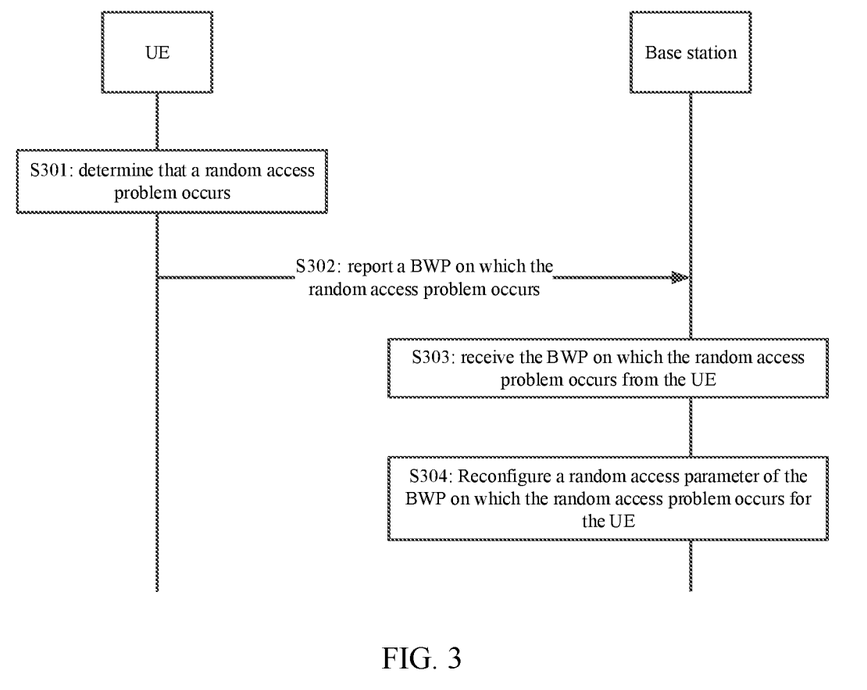
FIG. 3 is a signaling flowchart illustrating a BWP based operating method according to an example of the present disclosure.

FIG. 3 is a signaling flowchart illustrating a BWP based operating method according to an example of the present disclosure. This example is described from a perspective of interaction between UE and a base station. As shown in FIG. 3, the method includes the following steps.

At step S301, the UE determines that a random access problem occurs.

At step S302, the UE reports, to the base station, a BWP on which the random access problem occurs.

At step S303, the base station receives, from the UE, the BWP on which the random access problem occurs.

At step S304, the base station reconfigures, for the UE, a random access parameter of the BWP on which the random access problem occurs.

In the example, by the interaction between the base station and the UE, the base station may receive the BWP on which the random access problem occurs from the UE, and reconfigure the random access parameter of the BWP on which the random access problem occurs for the UE, such that the UE may re-perform random access.

Figure 4:
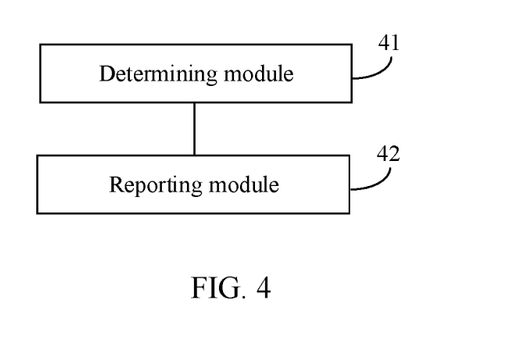
FIG. 4 is a block diagram illustrating an information reporting apparatus according to an example.

FIG. 4 is a block diagram illustrating an information reporting apparatus according to an example. This apparatus may be located in UE. As shown in FIG. 4, the apparatus includes: a determining module 41 and a reporting module 42.

The determining module 41 is configured to determine that a random access problem occurs.

The reporting module 42 is configured to report, to a base station, a BWP on which the random access problem determined by the determining module 41 occurs.

In the above example, by determining that the random access problem occurs, and reporting, to the base station, the BWP on which the random access problem occurs, the base station may determine the BWP on which the random access problem occurs.

Figure 5:
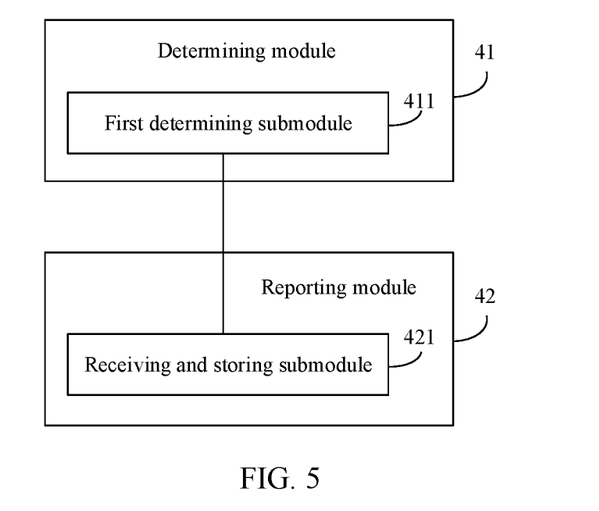
FIG. 5 is a block diagram illustrating another information reporting apparatus according to an example.

FIG. 5 is a block diagram illustrating another information reporting apparatus according to an example. As shown in FIG. 5, on the basis of the example shown in FIG. 4, the determining module 41 may include: a first determining submodule 411.

The first determining submodule 411 is configured to, in response to that random access is initiated on a PCell of an MCG and a number of random access preamble transmissions reaches a maximum number of transmissions, send first indication information to an RRC layer, wherein the first indication information indicates that the random access problem occurs.

The first determining submodule 411 is located on an MCG MAC layer.

The reporting module 42 may include: a receiving and storing submodule 421.

The receiving and storing submodule 421 is configured to receive the first indication information and store MCG RLF related information according to the first indication information, wherein the MCG RLF related information comprises the BWP on which the random access problem occurs.

The receiving and storing submodule 421 may be located on the RRC layer.

The BWP on which the random access problem occurs may include at least one of an uplink BWP on which the random access problem occurs; or a downlink BWP on which the random access problem occurs. If the UE is in a TDD mode, the BWP on which the random access problem occurs includes the uplink or downlink BWP on which the random access problem occurs. If the UE is in a FDD mode, the BWP on which the random access problem occurs includes the uplink or downlink BWP on which the random access problem occurs.

In this example, the BWP is identified by a UL BWP index or a DL BWP index. For the TDD mode, because the UL BWP is paired with the DL BWP, it is possible to indicate only the UL BWP index or the DL BWP index. For the FDD mode, although the UL BWP and the DL BWP are completely independent, the UL BWP and the DL BWP for random access have a mapping relationship. For example, a plurality of UL BWPs may be mapped to a single DL BWP, or single UL BWP may be mapped to a plurality of DL BWPs. Therefore, if the UL BWP may uniquely determine the DL BWP, only the UL BWP index may be indicated, or if the DL BWP may uniquely determine the UL BWP, only the DL BWP index may be indicated.

In the above example, when the random access is initiated on the Master Cell Group MCG Primary Cell PCell, and the number of random access preamble transmissions reaches the maximum number of transmissions, the first indication information is sent to the RRC layer so that it is determined that the random access problem occurs, and the MCG Radio Link Failure RLF related information is stored, providing conditions for the base station to subsequently determine the BWP on which the random access problem occurs.

Figure 6:
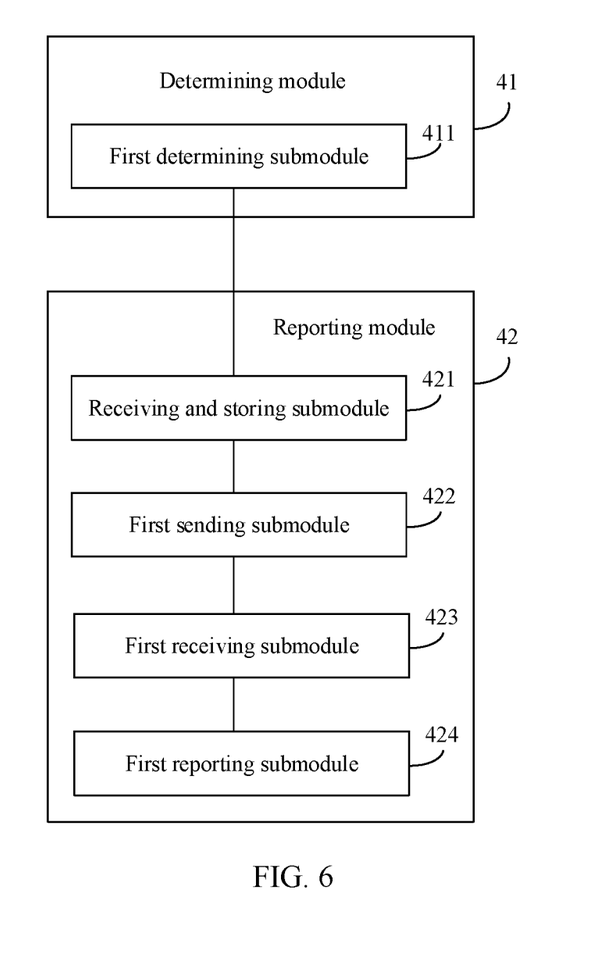
FIG. 6 is a block diagram illustrating another information reporting apparatus according to an example.

FIG. 6 is a block diagram illustrating another information reporting apparatus according to an example. As shown in FIG. 6, on the basis of the example shown in FIG. 5, the reporting module 42 may further include: a first sending submodule 422, a first receiving submodule 423 and a first reporting submodule 424.

The first sending submodule 422 is configured to, when a next connection operation is to be initiated, send second indication information to the base station, wherein the second indication information indicates that the UE stores the MCG RLF related information, and the next connection operation comprises connection establishment, connection restoration or connection reestablishment.

The next connection operation may include connection establishment, connection restoration, connection reestablishment, or the like. The MCG RLF related information may be stored in an RLF-Report.

The first receiving submodule 423 is configured to receive, from the base station, a request for acquiring the MCG RLF related information.

The first reporting submodule 424 is configured to report, in response to the request received by the first receiving submodule 423, the MCG RLF related information to the base station.

In the above example, when a next connection operation is to be initiated, the second indication information is sent to the base station, the request for acquiring the MCG RLF related information is received from the base station, and the MCG RLF related information is reported to the base station in response to the request received from the first receiving submodule. Thus, the base station may determine the BWP on which the random access problem occurs.

Figure 7:
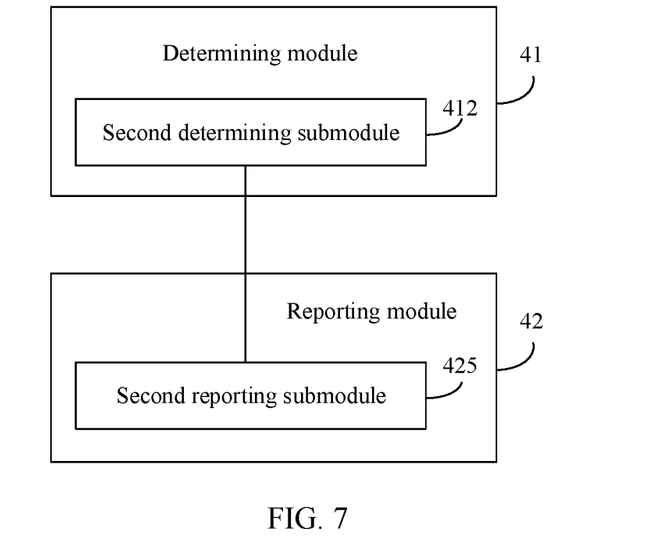
FIG. 7 is a block diagram illustrating another information reporting apparatus according to an example.

FIG. 7 is a block diagram illustrating another information reporting apparatus according to an example. As shown in FIG. 7, on the basis of the example shown in FIG. 4, the determining module 41 may include: a second determining submodule 412.

The second determining submodule 412 is configured to, in response to that random access is initiated on a PSCell of an SCG and a number of random access preamble transmissions reaches a maximum number of transmissions, send third indication information to an RRC layer, wherein the third indication information indicates that the random access problem occurs.

The second determining submodule 412 is located on an SCG MAC layer.

The reporting module 42 may include: a second reporting submodule 425.

The second reporting submodule 425 is configured to receive the third indication information and report SCG failure information according to the third indication information, wherein the SCG failure information comprises fourth indication information, and the fourth indication information indicates the BWP on which the random access problem occurs.

The second reporting submodule 425 may be located on the RRC layer.

The BWP on which the random access problem occurs may include at least one of an uplink BWP on which the random access problem occurs; or a downlink BWP on which the random access problem occurs. If the UE is in a TDD mode, the BWP on which the random access problem occurs includes the uplink or downlink BWP on which the random access problem occurs. If the UE is in a FDD mode, the BWP on which the random access problem occurs includes the uplink or downlink BWP on which the random access problem occurs.

In this example, the BWP is identified by a UL BWP index or a DL BWP index. For the TDD mode, because the UL BWP is paired with the DL BWP, it is possible to indicate only the UL BWP index or the DL BWP index. For the FDD mode, although the UL BWP and the DL BWP are completely independent, the UL BWP and the DL BWP for random access have a mapping relationship. For example, a plurality of UL BWPs may be mapped to a single DL BWP, or single UL BWP may be mapped to a plurality of DL BWPs. Therefore, if the UL BWP may uniquely determine the DL BWP, only the UL BWP index may be indicated, or if the DL BWP may uniquely determine the UL BWP, only the DL BWP index may be indicated.

In the above example, when the random access is initiated on the PSCell of the SCG and the number of random access preamble transmissions reaches the maximum number of transmissions, the third indication information which indicates that the random access problem occurs is sent to the RRC layer, and the SCG failure information is reported according to the third indication information. Thus, the base station may determine the BWP on which the random access problem occurs.

Figure 8:
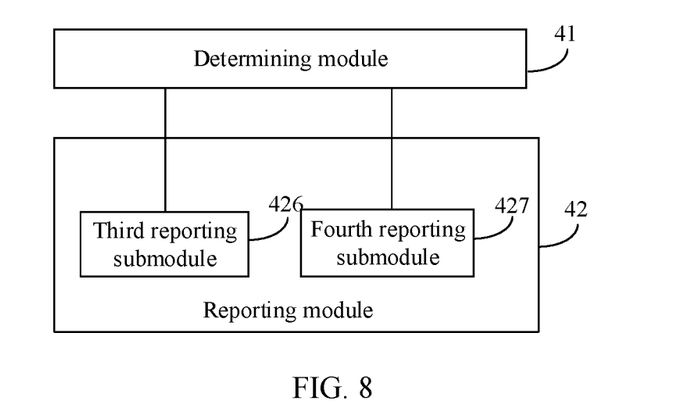
FIG. 8 is a block diagram illustrating another information reporting apparatus according to an example.

FIG. 8 is a block diagram illustrating another information reporting apparatus according to an example. As shown in FIG. 8, on the basis of the example shown in FIG. 4, the reporting module 42 may include: a third reporting submodule 426 or a fourth reporting submodule 427.

The third reporting submodule 426 is configured to, in response to that there is a random access resource on a currently activated BWP and the BWP on which the random access problem occurs is not the currently activated BWP, report, to the base station, the BWP on which the random access problem occurs.

The fourth reporting submodule 427 is configured to, in response to that there is no random access resource on the currently activated BWP and the BWP on which the random access problem occurs is not an initial BWP, report, to the base station, the BWP on which the random access problem occurs.

The BWP on which the random access problem occurs may include at least one of an uplink BWP on which the random access problem occurs; or a downlink BWP on which the random access problem occurs. If the UE is in a TDD mode, the BWP on which the random access problem occurs includes the uplink or downlink BWP on which the random access problem occurs. If the UE is in a FDD mode, the BWP on which the random access problem occurs includes the uplink or downlink BWP on which the random access problem occurs.

In this example, the BWP is identified by a UL BWP index or a DL BWP index. For the TDD mode, because the UL BWP is paired with the DL BWP, it is possible to indicate only the UL BWP index or the DL BWP index. For the FDD mode, although the UL BWP and the DL BWP are completely independent, the UL BWP and the DL BWP for random access have a mapping relationship. For example, a plurality of UL BWPs may be mapped to a single DL BWP, or single UL BWP may be mapped to a plurality of DL BWPs. Therefore, if the UL BWP may uniquely determine the DL BWP, only the UL BWP index may be indicated, or if the DL BWP may uniquely determine the UL BWP, only the DL BWP index may be indicated.

In the above example, when there is the random access resource on the currently activated BWP and the BWP on which the random access problem occurs is not the currently activated BWP, the BWP on which the random access problem occurs is reported to the base station. Alternatively, when there is no random access resource on the currently activated BWP and the BWP on which the random access problem occurs is not the initial BWP, the BWP on which the random access problem occurs is reported to the base station. Thus, the base station may determine the BWP on which the random access problem occurs.

Figure 9:
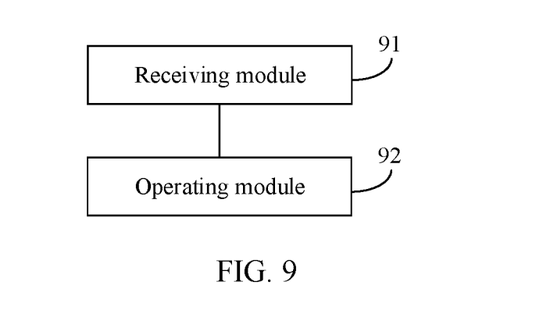
FIG. 9 is a block diagram illustrating a BWP based operating apparatus according to an example.

FIG. 9 is a block diagram illustrating a BWP based operating apparatus according to an example. The apparatus may be located in a base station. As shown in FIG. 9, the apparatus includes: a receiving module 91 and an operating module 92.

The receiving module 91 is configured to receive, from a user equipment UE, a BWP on which a random access problem occurs.

The operating module 92 is configured to reconfigure, for the UE, a random access parameter of the BWP on which the random access problem occurs received by the receiving module, or report, to another data collection entity, the random access problem corresponding to the BWP received by the receiving module for determining a cause of the random access problem.

In the above example, the BWP on which the random access problem occurs is received from the UE, and the random access parameter of the BWP on which the random access problem occurs is reconfigured for the UE, or the random access problem is reported to the another data collection entity for determining the cause of the random access problem. Thus, the base station may determine the BWP on which the random access problem occurs, and based on this, perform corresponding operations.

Figure 10:
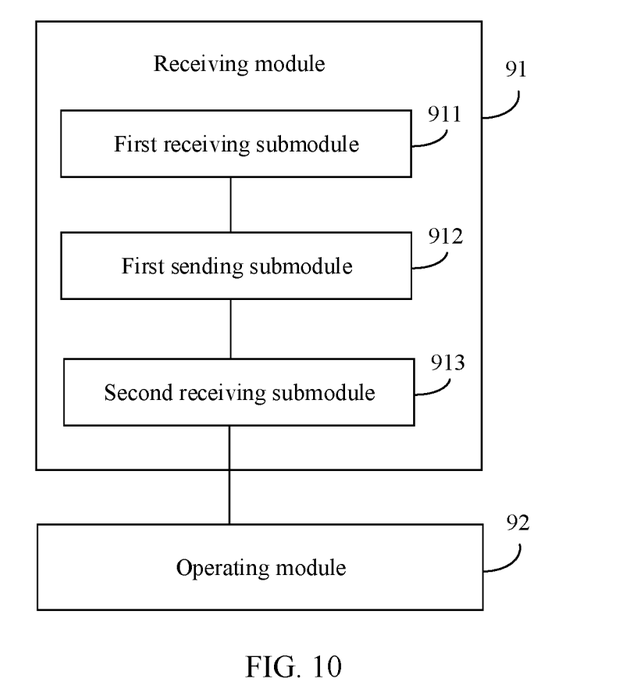
FIG. 10 is a block diagram illustrating another BWP based operating apparatus according to an example.

FIG. 10 is a block diagram illustrating another BWP based operating apparatus according to an example. As shown in FIG. 10, on the basis of the example shown in FIG. 9, the receiving module 91 may include: a first receiving submodule 911, a first sending submodule 912, and a second receiving submodule 913.

The first receiving submodule 911 is configured to receive, from the UE, second indication information which indicates that the UE stores MCG RLF related information, wherein the MCG RLF related information comprises the BWP on which the random access problem occurs The first sending submodule 912 is configured to send a request for acquiring the MCG RLF related information to the UE.

The second receiving submodule 913 is configured to receive the MCG RLF related information which is reported by the UE in response to the request sent by the first sending submodule 912.

In the above example, the second indication information is received from the UE, the request for acquiring the MCG RLF related information is sent to the UE, and the MCG RLF related information which is reported by the UE in response to the request sent by the first sending submodule is received. Thus, the BWP on which the random access problem occurs is determined.

Figure 11:
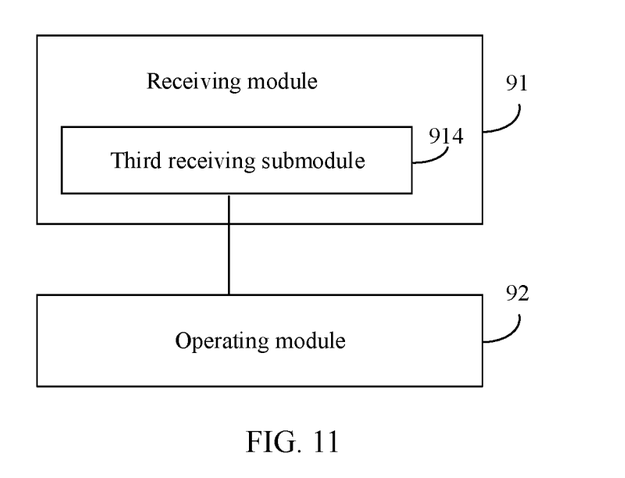
FIG. 11 is a block diagram illustrating another BWP based operating apparatus according to an example.

FIG. 11 is a block diagram illustrating another BWP based operating apparatus according to an example. As shown in FIG. 11, on the basis of the example shown in FIG. 9, the receiving module 91 may include a third receiving submodule 914.

The third receiving submodule 914 is configured to receive, from the UE, SCG failure information which comprises fourth indication information, wherein the fourth indication information indicates the BWP on which the random access problem occurs.

In the above example, by receiving the SCG failure information from the UE, the BWP on which the random access problem occurs is determined.

Figure 12:
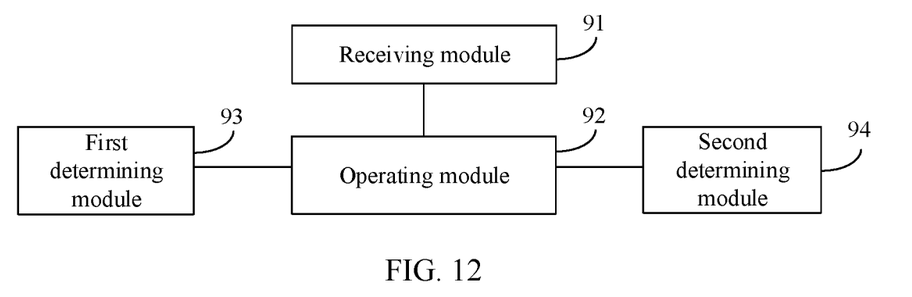
FIG. 12 is a block diagram illustrating another BWP based operating apparatus according to an example.

FIG. 12 is a block diagram illustrating another BWP based operating apparatus according to an example. As shown in FIG. 12, on the basis of the example shown in FIG. 9, the apparatus may further include: a first determining module 93 or a second determining module 94.

The first determining module 93 is configured to, in response to that no report concerning the BWP on which the random access problem occurs is received from the UE and there is a random access resource on a currently activated BWP, determine that the currently activated BWP is the BWP on which the random access problem occurs.

The second determining module 94 is configured to, in response to that no report concerning the BWP on which the random access problem occurs is received from the UE and there is no random access resource on the currently activated BWP, determine that an initial BWP is the BWP on which the random access problem occurs.

The operation module 92 is further configured to reconfigure, for the UE, the random access parameter of the BWP on which the random access problem occurs determined by the first determining module 93 or the second determining module 94, or report, to the another data collection entity, the random access problem corresponding to the BWP determined by the first determining module 93 or the second determining module 94 for determining the cause of the random access problem.

In the above example, when the BWP on which the random access problem occurs is not received from the UE, while there is the random access resource on the currently activated BWP, it is determined that the currently activated BWP is the BWP on which the random access problem occurs. When the BWP on which the random access problem occurs is not received from the UE, while there is no random access resource on the currently activated BWP, it is determined that the initial BWP is the BWP on which the random access problem occur. Thus, in a case that the BWP on which the random access problem occurs is not received from the UE, the BWP on which the random access problem occurs may also be determined.

Figure 13:
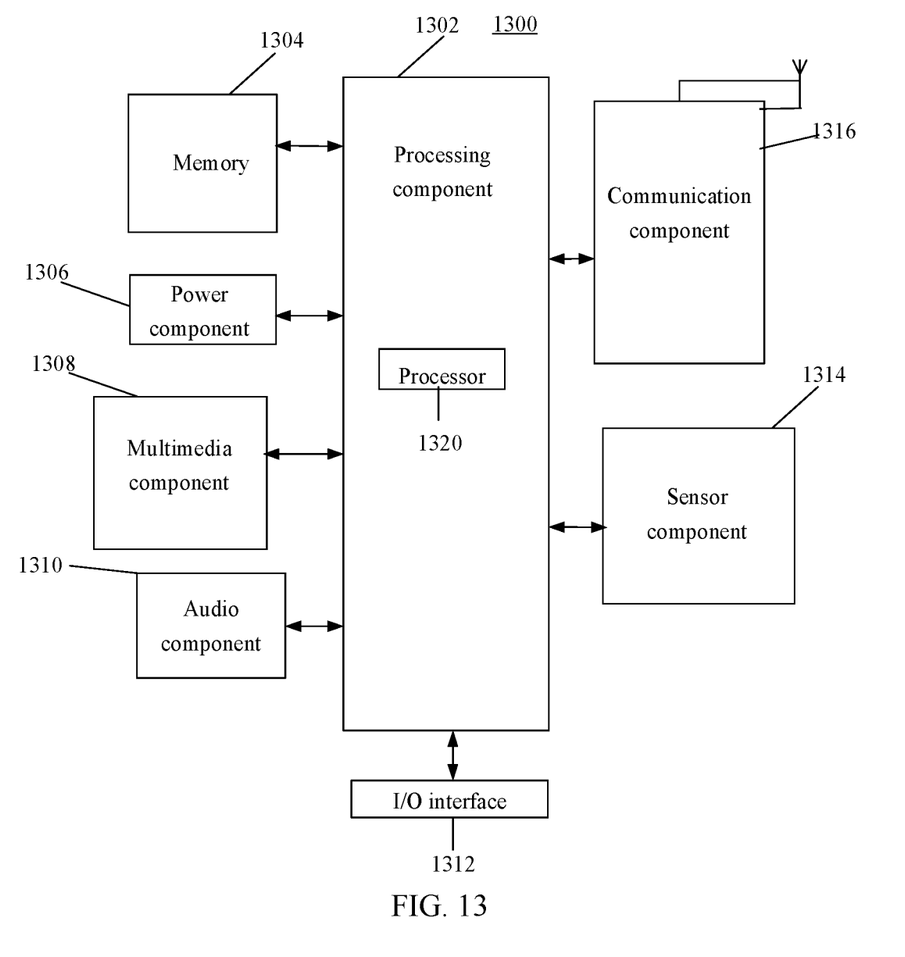
FIG. 13 is a block diagram illustrating an apparatus suitable for reporting information according to an example.

FIG. 13 is a block diagram illustrating an apparatus suitable for reporting information according to an example. For example, an apparatus 1300 may be user equipment, such as, a mobile phone, a computer, a digital broadcast terminal, a messaging device, a game console, a tablet device, a medical equipment, a fitness equipment, a personal digital assistant, or the like.

Referring to FIG. 13, the apparatus 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 usually controls the overall operation of the apparatus 1300, such as operations associated with display, telephone calls, data communications, camera operations, and recording operations. The processing component 1302 may include one or more processors 1320 to execute instructions to perform all or part of the steps in the methods described above. Moreover, the processing component 1302 may include one or more modules to facilitate interaction between the processing component 1302 and other components. For example, the processing component 1302 may include a multimedia module to facilitate interaction between the multimedia component 1308 and the processing component 1302.

One of the processors 1320 in the processing component 1302 may be configured to:
  determine that a random access problem occurs; and
  report, to a base station, a BWP on which the random access problem occurs.

The memory 1304 is configured to store various types of data to support operation at the apparatus 1300. Examples of these data include instructions for any application or method operating at the apparatus 1300, contact data, phone book data, messages, pictures, videos, and the like. The memory 1304 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1306 provides power to various components of the apparatus 1300. The power component 1306 may include a power management system, one or more power sources, and other components associated with power generated, managed, and distributed for the apparatus 1300.

The multimedia component 1308 includes a screen that provides an output interface between the apparatus 1300 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1308 includes a front camera and/or a rear camera. When the apparatus 1300 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1310 is configured to output and/or input audio signals. For example, the audio component 1310 includes a microphone (MIC) configured to receive an external audio signal when the apparatus 1300 is in an operation mode, such as a call mode, a recording mode, and a voice recognition mode. The received audio signal may be further stored in the memory 1304 or transmitted via the communication component 1316. In some examples, the audio component 1310 also includes a loudspeaker for outputting an audio signal.

The I/O interface 1312 provides an interface between the processing component 1302 and a peripheral interface module which may be a keyboard, a click wheel, a button, or the like. These buttons may include, but are not limited to a home button, a volume button, a start button, and a lock button.

The sensor component 1314 includes one or more sensors for providing a status assessment in various aspects to the apparatus 1300. For example, the sensor component 1314 may detect an open/closed state of the apparatus 1300, and the relative positioning of components, for example, the component is a display and a keypad of the apparatus 1300. The sensor component 1314 may also detect a change in position of the apparatus 1300 or a component of the apparatus 1300, the presence or absence of a user in contact with the apparatus 1300, the orientation or acceleration/deceleration of the apparatus 1300 and a change in temperature of the apparatus 1300. The sensor component 1314 may include a proximity sensor configured to detect the presence of nearby objects without any physical contact. The sensor component 1314 may also include a light sensor, such as a CMOS or CCD image sensor, for use in imaging applications. In some examples, the sensor component 1314 may also include an acceleration sensor, a gyro sensor, a magnetic sensor, a pressure sensor, or a temperature sensor.

The communication component 1316 is configured to facilitate wired or wireless communication between the apparatus 1300 and other devices. The apparatus 1300 may access a wireless network based on a communication standard, such as WiFi, 2G or 3G, or a combination thereof. In an example, the communication component 1316 receives broadcast signals or broadcast associated information from an external broadcast management system via a broadcast channel. In an example, the communication component 1316 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1300 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 1304 including instructions, wherein the instructions are executable by the processor 1320 of the apparatus 1300 to perform the method as described above. For example, the non-transitory computer readable storage medium may be a ROM, a random access memory (RAM), a CD-ROM, a magnetic tape, a floppy disk, and an optical data storage device.

Figure 14:
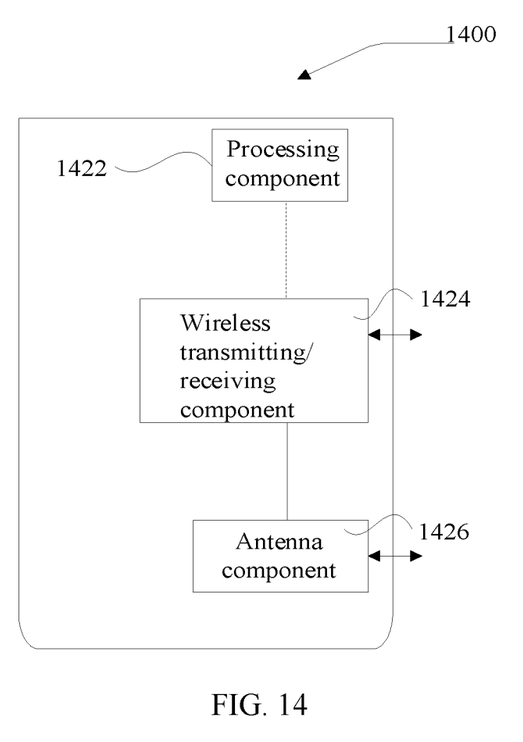
FIG. 14 is a block diagram illustrating an apparatus suitable for operating based on a BWP according to an example.

FIG. 14 is a block diagram illustrating an apparatus suitable for operating based on a BWP according to an example. The apparatus 1400 may be provided to a base station. Referring to FIG. 14, the apparatus 1400 includes a processing component 1422, a wireless transmitting/receiving component 1424, an antenna component 1426, and a signal processing portion specific to a wireless interface. The processing component 1422 may further include one or more processors.

One of the processors in the processing component 1422 may be configured to:
  receive, from UE, a BWP on which a random access problem occurs; and reconfigure, for the UE, a random access parameter of the BWP on which the random access problem occurs, or report the random access problem to another data collection entity for determining a cause of the random access problem.

In an example, there is also provided a non-transitory computer readable storage medium having computer instructions stored thereon, wherein the instructions are executable by the processing component 1422 of the apparatus 1400 to perform the bandwidth part BWP based operating method as described above. For example, the non-transitory computer readable storage medium may be a ROM, a random access memory (RAM), a CD-ROM, a magnetic tape, a floppy disk, and an optical data storage device.

For the apparatus examples, since they basically correspond to the method examples, reference may be made to the partial description of the method examples. The apparatus examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

What is claimed is:

1. An information reporting method, implemented by a user equipment (UE), and comprising:
   receiving an instruction to switch from one bandwidth part (BWP) to another BWP via a Physical Downlink Control Channel (PDCCH) when random access is performed;
   determining that a random access problem occurs; and
   reporting, to a base station, a BWP on which the random access problem occurs, to thereby facilitate the base station reporting the random access problem to another data collection entity for determining a cause of the random access problem;
   wherein in response to the UE being in a time division duplex (TDD) mode, the BWP on which the random access problem occurs comprises an uplink BWP on which the random access problem occurs.

2. The method according to claim 1, wherein determining that the random access problem occurs comprises:
   in response to that random access is initiated on a primary cell (PCell) of a master cell group (MCG) and a number of random access preamble transmissions reaches a maximum number of transmissions, sending first indication information from an MCG media access control (MAC) layer to a radio resource control (RRC) layer, wherein the first indication information indicates that the random access problem occurs; and
   reporting, to the base station, the BWP on which the random access problem occurs comprises:
   receiving, by the RRC layer, the first indication information; and
   storing, by the RRC layer, MCG radio link failure (RLF) related information according to the first indication information, wherein the MCG RLF related information comprises an indication to the BWP on which the random access problem occurs.

3. The method according to claim 2, wherein reporting, to the base station, the BWP on which the random access problem occurs further comprises:
   when a next connection operation is to be initiated, sending second indication information to the base station, wherein the second indication information indicates that the UE stores the MCG RLF related information, and the next connection operation comprises connection establishment, connection restoration or connection reestablishment;
   receiving, from the base station, a request for acquiring the MCG RLF related information; and
   reporting, in response to the request, the MCG RLF related information to the base station.

4. The method according to claim 1, wherein determining that the random access problem occurs comprises:
   in response to that random access is initiated on a primary secondary cell (PSCell) of a secondary cell group (SCG) and a number of random access preamble transmissions reaches a maximum number of transmissions, sending third indication information from an SCG MAC layer to an RRC layer, wherein the third indication information indicates that the random access problem occurs; and
   reporting, to the base station, the BWP on which the random access problem occurs comprises:
   receiving, by the RRC layer, the third indication information; and
   reporting, by the RRC layer, SCG failure information according to the third indication information, wherein the SCG failure information comprises fourth indication information, and the fourth indication information indicates the BWP on which the random access problem occurs.

5. The method according to claim 1, wherein reporting, to the base station, the BWP on which the random access problem occurs comprises:

in response to that there is a random access resource on a currently activated BWP and the BWP on which the random access problem occurs is not the currently activated BWP, reporting, to the base station, the BWP on which the random access problem occurs; or in response to that there is no random access resource on the currently activated BWP and the BWP on which the random access problem occurs is not an initial BWP, reporting, to the base station, the BWP on which the random access problem occurs.

6. A communication system implementing the method according to claim 1, comprising the UE and the base station, wherein the base station is configured to perform:
receiving, from the UE, an indication to a BWP on which a random access problem occurs; and
reconfiguring, for the UE, a random access parameter of the BWP on which the random access problem occurs, and reporting the random access problem to another data collection entity for determining a cause of the random access problem;

Wherein the receiving, from the UE, the indication to the BWP on which the random access problem occurs comprises:
receiving, from the UE, second indication information which indicates that the UE stores MCG RLF related information, wherein the MCG RLF related information comprises the indication to the BWP on which the random access problem occurs;
sending a request for acquiring the MCG RLF related information to the UE; and
receiving the MCG RLF related information reported by the UE in response to the request;

wherein the base station is further configured to:
determine the BWP on which the random access problem occurs based on the UE's determining that the random access problem occurs, and reporting the BWP on which the random access problem occurs to the base station; and
perform corresponding operations based on the determined BWP.

7. A bandwidth part (BWP) based operating method, implemented by a base station, and comprising:
sending an instruction to a user equipment (UE) to switch from one bandwidth part (BWP) to another BWP via a Physical Downlink Control Channel (PDCCH) when random access is performed;
receiving, from the UE, an indication to a BWP on which a random access problem occurs, wherein the BWP on which the random access problem occurs comprises an uplink BWP on which the random access problem occurs and the UE is in a time division duplex (TDD) mode; and
reporting the random access problem to another data collection entity for determining a cause of the random access problem.

8. The method according to claim 7, wherein receiving, from the UE, the indication to the BWP on which the random access problem occurs comprises:
receiving, from the UE, second indication information which indicates that the UE stores MCG RLF related information, wherein the MCG RLF related information comprises the indication to BWP on which the random access problem occurs;
sending a request for acquiring the MCG RLF related information to the UE; and receiving the MCG RLF related information reported by the UE in response to the request.

9. The method according to claim 7, wherein receiving, from the UE, the indication to the BWP on which the random access problem occurs comprises:
receiving, from the UE, SCG failure information which comprises fourth indication information, wherein the fourth indication information indicates the BWP on which the random access problem occurs.

10. A base station implementing the method according to claim 7, comprising:
a processor; and
memory for storing instructions executable by the processor,
wherein the processor is configured to implement operations of the method.

11. A user equipment (UE), comprising:
a processor; and
a memory for storing instructions executable by the processor,
wherein the processor is configured to:
receive an instruction to switch from one bandwidth part (BWP) to another BWP via a Physical Downlink Control Channel (PDCCH) when random access is performed;
determine that a random access problem occurs; and
report, to a base station, a BWP on which the random access problem occurs, to thereby facilitate the base station reporting the random access problem to another data collection entity for determining a cause of the random access problem;
wherein in response to the UE being in a time division duplex (TDD) mode, the BWP on which the random access problem occurs comprises an uplink BWP on which the random access problem occurs.

12. The user equipment according to claim 11, wherein determining that the random access problem occurs comprises:
in response to that random access is initiated on a PCell of an MCG and a number of random access preamble transmissions reaches a maximum number of transmissions, sending first indication information from an MCG MAC layer to an RRC layer, wherein the first indication information indicates that the random access problem occurs; and
reporting, to the base station, the BWP on which the random access problem occurs comprises:
receiving, by the RRC layer, the first indication information; and
storing, by the RRC layer, MCG RLF related information according to the first indication information, wherein the MCG RLF related information comprises an indication to the BWP on which the random access problem occurs.

13. The user equipment according to claim 12, wherein reporting, to the base station, the BWP on which the random access problem occurs further comprises:
when a next connection operation is to be initiated, sending second indication information to the base station, wherein the second indication information indicates that the UE stores the MCG RLF related information, and the next connection operation comprises connection establishment, connection restoration or connection reestablishment;
receiving, from the base station, a request for acquiring the MCG RLF related information; and reporting, in response to the request, the MCG RLF related information to the base station.

14. The user equipment according to claim 11, wherein the determining that the random access problem occurs comprises:
- in response to that random access is initiated on a primary secondary cell (PSCell) of a secondary cell group (SCG) and a number of random access preamble transmissions reaches a maximum number of transmissions, sending third indication information from an SCG MAC layer to an RRC layer, wherein the third indication information indicates that the random access problem occurs; and
- reporting, to the base station, the BWP on which the random access problem occurs comprises:
  - receiving, by the RRC layer, the third indication information; and
  - reporting, by the RRC layer, SCG failure information according to the third indication information, wherein the SCG failure information comprises fourth indication information, and the fourth indication information indicates the BWP on which the random access problem occurs.

15. The user equipment according to claim 11, wherein the reporting, to the base station, the BWP on which the random access problem occurs comprises:
- in response to that there is a random access resource on a currently activated BWP and the BWP on which the random access problem occurs is not the currently activated BWP, reporting, to the base station, the BWP on which the random access problem occurs; or
- in response to that there is no random access resource on the currently activated BWP and the BWP on which the random access problem occurs is not an initial BWP, reporting, to the base station, the BWP on which the random access problem occurs.

* * * * *